United States Patent [19]
Perets et al.

[11] Patent Number: 5,537,576
[45] Date of Patent: Jul. 16, 1996

[54] EXPANDABLE MEMORY FOR A DIGITAL SIGNAL PROCESSOR INCLUDING MAPPED FIRST AND SECOND MEMORY BANKS FORMING A CONTINUOUS AND CONTIGUOUS ADDRESS SPACE

[75] Inventors: Ronen Perets, Ramat-Gan; Yair Be'ery, Petach-Tikva; Bat-Sheva Ovadia, Herzeliya; Yael Gross, Tel-Aviv; Yakov Milstein, Natanya; Gideon Wertheizer, Petach-Tikva, all of Israel

[73] Assignees: DSP Semiconductors Ltd., Israel; DSP Semiconductors USA, Inc., San Jose, Calif.

[21] Appl. No.: 81,670

[22] Filed: Jun. 23, 1993

[51] Int. Cl.⁶ .............................. G06F 12/00; G06F 13/00
[52] U.S. Cl. .................. 395/477; 395/495; 395/497.02; 364/246.3; 364/246.7; 364/256; 364/256.2; 364/951.2; 364/956.4; 364/966.4; 364/966.7; 364/969.1; 364/DIG. 1
[58] Field of Search .............................. 364/246.3, 246.7, 364/256, 256.2, 951.2, 956.4, 966.4, 966.7, 969.1, 230.03, 230.04; 395/477, 495, 497.02

[56] References Cited

U.S. PATENT DOCUMENTS

| | | | |
|---|---|---|---|
| 3,949,378 | 4/1976 | Crabb et al. | 395/400 |
| 4,623,244 | 11/1986 | Andrews et al. | 355/24 |
| 5,226,122 | 7/1993 | Thayer et al. | 395/275 |
| 5,249,280 | 9/1993 | Nash et al. | 395/425 |
| 5,269,010 | 12/1993 | MacDonald | 395/425 |

*Primary Examiner*—Tod R. Swann
*Assistant Examiner*—Frank J. Asta
*Attorney, Agent, or Firm*—Leonard Bloom

[57] ABSTRACT

A data processing and addressing unit for processing a set of either first or second type instructions having associated therewith operands stored in a single memory bank and operands stored in two memory banks, respectively. First and second memory banks are mapped in continuous memory address space such that a bottom address of the second memory bank is contiguous with a top address of the first memory bank. A method is employed for mapping the first and second memory banks so as to permit memory expansion or contraction while permitting the first and second memory banks to be configured as a single continuous buffer or as two distinct buffers, as required. According to the method, the first memory bank is mapped as a negative offset with respect to the bottom address of the second memory bank such that the top address of the first memory bank has an offset of −1 and a bottom address thereof has an offset of −(first size); and the second memory bank is mapped as a positive offset with respect to the bottom address of the second memory bank such that a top address thereof has an offset of (second size −1). Expansion or contraction of the first and second memory banks may thus be effected relative to a common boundary between the two memory banks and independent of their respective sizes.

7 Claims, 5 Drawing Sheets

EXPANDABLE MEMORY FOR A DIGITAL SIGNAL PROCESSOR INCLUDING MAPPED FIRST AND SECOND MEMORY BANKS FORMING A CONTINUOUS AND CONTIGUOUS ADDRESS SPACE

FIELD OF THE INVENTION

The present invention relates to the field of memory mapping in general purpose processors and, in particular, in digital signal processors.

BACKGROUND OF THE INVENTION

General Purpose Processors or Digital Signal Processors (DSP) generally require two operands for each processor cycle in order to utilize the processor efficiently. This is, in particular, mandatory due to the heavy processing load demanded in a typical signal processing task for which the digital signal processor is dedicated.

Conventionally, this requirement is addressed by allocating two distinct memory banks: one of which stores the data corresponding to the first operand, the other storing the data corresponding to the second operand. Consequently, two operands may be accessed simultaneously and transferred to a multiplier and/or an arithmetic logic unit (ALU) in order to be processed. The separate memory banks may be mapped at the same addresses, each having its own respective data addressing unit or, as is more commonly done, each of the banks may be mapped at a specified memory address.

Examples of such an approach may be found, for example, in the Texas Instrument TMS32025 User Guide and in the Motorola DSP56000 User Guide. Similarly, "Programmable DSP Architectures: Part I" by Edward A. Lee, IEEE ASSP Magazine, December 1988 provides a solution to the problem of simultaneous addressing of two memory locations using respective memory banks. Whilst such a solution serves as an effective arrangement for simultaneous addressing of two operands, it implies that the programmer must split his database into two pans. This may cause swapping of data between the two banks which increases the length of both the execution time and of the code. The resultant overhead in time and resources is clearly unsatisfactory in the signal processing real time environment in which tremendous effort is invested in the reduction of operating time.

It is known to use a dual port memory in order to obtain the desired memory bank mapping which will serve for efficient storage of both the two operand scheme instruction and a single operand scheme instruction. Thus, there is described in the Motorola DSP 56116 User Guide a device which may be accessed at two different addresses in the same cycle, whereby it is possible to access two operands simultaneously. Alternatively, only a single address may be accessed which is useful for the one operand access mode.

Whilst the dual port memory is the perfect solution from the architectural point of view, the dual port memory cell is much bigger than the previous single port memory cell and therefore, requires larger dies for its manufacture which are considerably more expensive, and therefore commercially unattractive for applications at the low end of the market.

For overcoming the contradictory requirements of a memory arrangement which serves equally well for accessing single operand instructions from a specified memory bank or dual operand instructions from either the same or different memory banks, two single port memory banks may be arranged so as to form a continuous address base. Thus, for example, two memory banks, each having a capacity of 512 bytes, may be mapped respectively at the address space of 0 to 511 and 512 to 1023, so as to produce a continuous address space. In operation, whenever it is desired to work in the two operand access mode, each memory bank is addressed in order to achieve the corresponding operand.

On the other hand, if the single operand mode be desired, then two alternative procedures must be considered. In the case where the data block which stores the first operand occupies less than 512 bytes, then the data may be stored in its entirety in only one of the memory banks or may be split, as required, between both memory banks. Alternatively, if the data block occupies more than 512 bytes, then there is no choice in the matter: the data must be split between both memory banks. The continuous memory characteristic ensures that if the address pointer is set to address 511 and the next operand is to be fetched, the pointer will be incremented so as to point to the address 512. Logic is provided to adjust the address 512 so as to point to the first byte of the second memory bank, whereby no overhead operations are required, this being an essential condition for the real time environment in which the digital signal processor is embedded.

By means of such an approach, the above-mentioned drawbacks are eliminated, there being provided an arrangement comprising two banks, each being a single port memory which enables both two operand and one operand mode of operation, whereby the commercial requirements are also met.

This notwithstanding, such an arrangement still fails to meet additional requirement: namely, the expansion of each memory bank. Thus, consider the situation in which it is desired to expand each of the memory banks from 512 bytes to 1 Kbyte. In such case, the 512 byte module is removed and replaced by a 1 Kbyte module. The same holds true for the second memory bank. Such an approach has two inherent drawbacks. First, it involves modifications to the hardware which in turn require the logic design to be reconfigured. Secondly, it gives rise to software incompatibility whereby code which was programmed before modification to the hardware was effected is no longer compatible with the new memory mapping. Thus, if the software points to an address corresponding to 520th byte, this would originally have pointed to a memory location in the second module. However, with the expanded memory, it will now need to point to a memory location in the expanded first module and will thus require modification to the software. The requirement to update all software on expanding the DSP's capacity is clearly undesirable.

It is therefore the object of the present invention to provide a memory arrangement scheme which will serve both for single and dual operand instruction types as the case may be, by utilizing a single port memory and, at the same time, to meet the additional requirement of flexible memory expansion and contraction by simply replacing the module, whilst retaining the continuous address space characteristic.

SUMMARY OF THE INVENTION

According to the invention there is provided for use with a data addressing and processing unit comprising processing and addressing means for processing a specified set of instructions selected simultaneously from a first or second type instruction and addressing a corresponding memory location; the first type being associated with data accessed from a single memory bank only and the second type being associated with data accessed from two memory banks; the data addressing and processing unit further including:

- first and second memory banks having respective first and second sizes which, in total, occupy less no more than an entire address space allocated in the data processing and addressing unit; said first and second memory banks being mapped in continuous memory address space such that a bottom address of the second memory bank is contiguous with a top address of the first memory bank;
- a method of mapping the first and second memory banks so as to permit memory expansion or contraction whilst permitting the first and second memory banks to be configured as a single continuous buffer or as two distinct buffers, as required, the method comprising the steps of:
  - (i) mapping the first memory bank as a negative offset with respect to the bottom address of the second memory bank such that the top address of the first memory bank has an offset of −1 and a bottom address thereof has an offset of −(first size); and
  - (ii) mapping the second memory bank as a positive offset with respect to the bottom address of the second memory bank such that a top address thereof has an offset of (second size −1);

whereby expansion or contraction of the first and second memory banks may be effected relative to a common boundary between the two memory banks and independent of their respective sizes.

In accordance with a further aspect of the invention there is provided a data processing and addressing unit for processing and addressing a set of either first or second type instructions having associated therewith operands stored in a single memory bank and operands stored in two memory banks, respectively, said data processing and addressing unit comprising:

an address space of a predetermined size,

- first and second memory banks having respective first and second sizes which in total are no greater than the predetermined size of the address space and which are mapped in continuous memory address space such that a bottom address of the second memory bank is contiguous with a top address of the first memory bank,
- first and second address lines for respectively carrying an address of a first and second operand,
- control means coupled to the first and second address lines and responsive to an instruction of said first type and to the address on the second line for generating a first switching signal as well as first and second memory bank selection signals, and being responsive to an instruction of said second type and to the address on the second address line for generating a second switching signal as well as a second memory bank selection signal, and
- switching means coupled to the control means and responsive to the first switching signal for connecting the second address line to the first and second memory banks and being responsive to the second switching signal for connecting the first address line to the first memory bank;
- whereby a single operand of a first type instruction is selected from either the first or second memory bank according to whether the address on the second address line points to an address in the first or second memory bank, respectively; and first and second operands of a second type instruction are respectively selected from the first and second memory banks.

It should be noted that in the following description of a preferred embodiment reference to the addresses within the first and second memory banks are in words and the reference to the top and bottom addresses assumes unsigned arithmetic. However, the addresses may equally well be in bytes having a known number of bits, or in any other denomination. It should further be noted that a modulus arithmetic is assumed. Thus, for example, if the entire address space occupies 64 Kbyte, then the top address is $(FFFF)_{hex}$ and the next address is 0 and not $(10000)_{hex}$.

In the following description, the term "2's complement" has its conventional meaning, i.e. the negation of a binary value.

Generally, in the case of second type instructions, the data block constituting the first operand is stored in the first memory bank whilst the data block which constitutes the second operand is stored in the second memory bank. If, on the other hand, the instructions are of the first type, then the operands may be stored in a single memory bank, if space permits, or may be shared between both the memory banks, either if space so dictates or for any other reason.

In accordance with the invention, in the event that the two memory banks are contiguous, a continuous address space is obtained. In such case, upon retrieving data from the top memory location of the first memory bank, subsequent data is automatically retrieved from the bottom memory location of the second memory bank.

In operation, when an instruction is fetched, the control unit determines whether it belongs to the first or second type. In the latter case, two operands are retrieved: one from the second memory bank according to an address loaded on the second address line, and the other from the first memory bank according to an address derived by inverting the value of an address loaded on the first address line.

If, on the other hand, the control unit determines that an instruction is of the first type requiring only a single operand, then it connects the second address line directly to the second memory bank and disconnects the first address line which is not required. Thus, the address loaded on the second address line is coupled directly to the second memory bank and, at the same time, is fed to an inverter, whereby its inverted value is fed to the first memory bank. The control unit selects which of the banks is active in order that the required operand may be retrieved therefrom and fed, via the data bus, to the ALU.

In either case, a continuous address space is provided allowing for complete flexibility of memory expansion or contraction simply by replacing the memory modules corresponding to the first and second memory banks.

BRIEF DESCRIPTION OF THE DRAWINGS

For a clearer understanding of the invention and to see how the same may be carried out in practice, some preferred embodiments will now be described, by way of non-limiting example only, with reference to the accompanying drawings, in which.

DETAILED DESCRIPTION OF PREFERRED EMBODIMENTS

Figure 1:
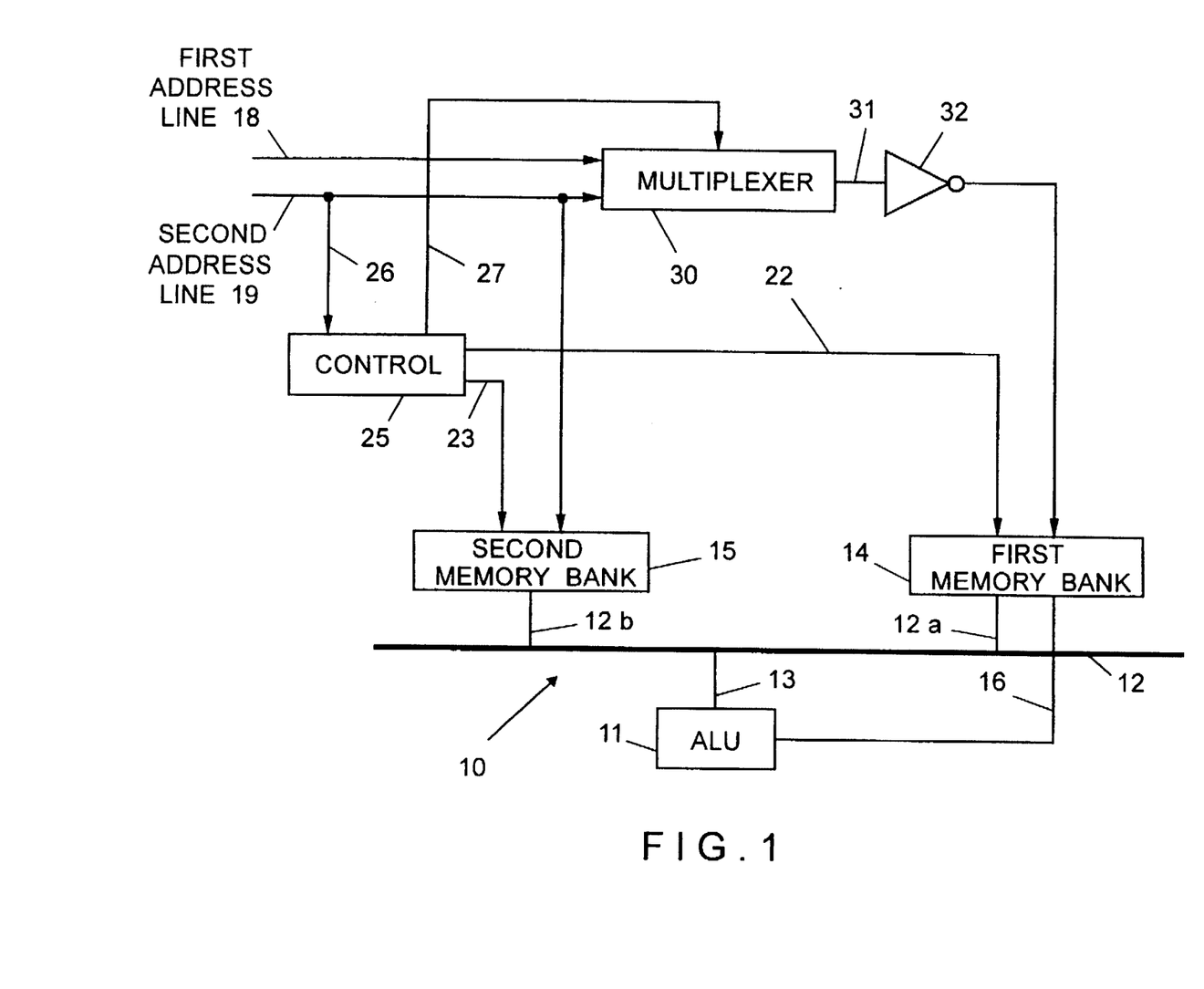
FIG. 1 is a schematic illustration of a detail of a data addressing and processing unit containing two memory banks, in accordance with one embodiment of the invention.

FIG. 1 shows schematically a typical data processing and addressing unit depicted generally as 10 for use with a Digital Signal Processor comprising an arithmetic logic unit (ALU) 11 coupled to a data bus 12 via a first connection 13. Two memory banks 14 and 15 each being a single port random access memory (RAM) are coupled to the data bus 12 via respective data buses 12a and 12b. The ALU 11 is coupled to the first memory bank 14 via a dedicated bus 16. For the sake of explanation, it is assumed that the memory address space is 64 Kbyte from 0–(FFFF)$_{hex}$. Each of the memory banks 14 and 15 has a capacity of 512 bytes. The first memory bank 14 is mapped to the address range of (FE00)$_{hex}$ to (FFFF)$_{hex}$ whilst the second memory bank is mapped to the address range 0 to (1FF)$_{hex}$.

Associated with the memory banks 14 and 15 are first and second address lines 18 and 19. In the case of a first type instruction, only a single operand is required and its address is carried by the second address line 19. In the case of second type instruction requiring two operands, the address of one operand is carried by the first address line 18 whilst that of the second operand is carried by the second address line 19. Thus, one or both of the memory banks 14 and 15 feeds a respective operand to the data bus 12 according to whether it is selected by a corresponding select line 22 and 23 which are switchable via a control unit 25. The control unit 25 has an input 26 which is coupled to the address line 19 and an output 27 which is fed to a multiplexer 30. The multiplexer 30 has a single output 31 which is connected to the first memory bank 14 via an inverter 32.

In respect of an instruction of the second type (i.e. requiring two operands simultaneously), the control unit 25 passes a corresponding signal appearing at its output 27 to the multiplexer 30 for switching the data appearing on the first address line 18 to the output 31 of the multiplexer 30. This data address is inverted by the inverter 32 and points to one of the memory locations in the first memory bank 14.

For the sake of completeness, it should be noted that the program to be executed and in which some of the instructions are from the first type or the second type, can be stored in one of the two memory banks 14 and 15 or, alternatively, somewhere else in memory. The manner in which the instructions are decoded are not themselves features of the invention.

The control unit 25 determines whether an instruction which is fetched from the program memory area is of the first or second type, i.e. whether it is associated with one or two operands; or, indeed, whether an instruction is of a kind requiring no access to the memory.

Figure 2:
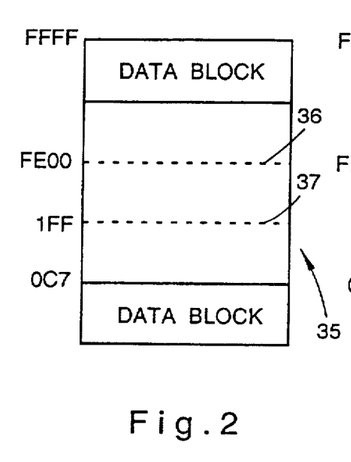
FIG. 2 shows schematically a logical arrangement of first and second memory banks constituting two distinct buffers.

FIG. 2 shows a typical arrangement of data blocks in the first and second memory banks 14 and 15, comprising an address space 35 in which the first memory bank 14 and the second memory bank 15 are suitably mapped. A bottom address of the first memory bank 14 and a top address of the second memory bank 15 are each marked as dashed lines 36 and 37 respectively.

Consider that there are to be executed two hundred instructions of the second type, for example a combination of multiplication and adding instructions each requiring two memory operands. Let it further be assumed that the data block which constitutes the first operand is stored in the first memory bank 14 from addresses (FF38)$_{hex}$ to (FFFF)$_{hex}$ which occupies 200 bytes, and that the corresponding second operands are stored in the second memory bank 15 from addresses 0 to (0C7)$_{hex}$, also occupying 200 bytes. Thus, the dashed lines 36 and 37 show the bottom address (FE00)$_{hex}$ of the first memory bank 14 and the top address (1FF)$_{hex}$ of the second memory bank 15, respectively.

Figure 3:
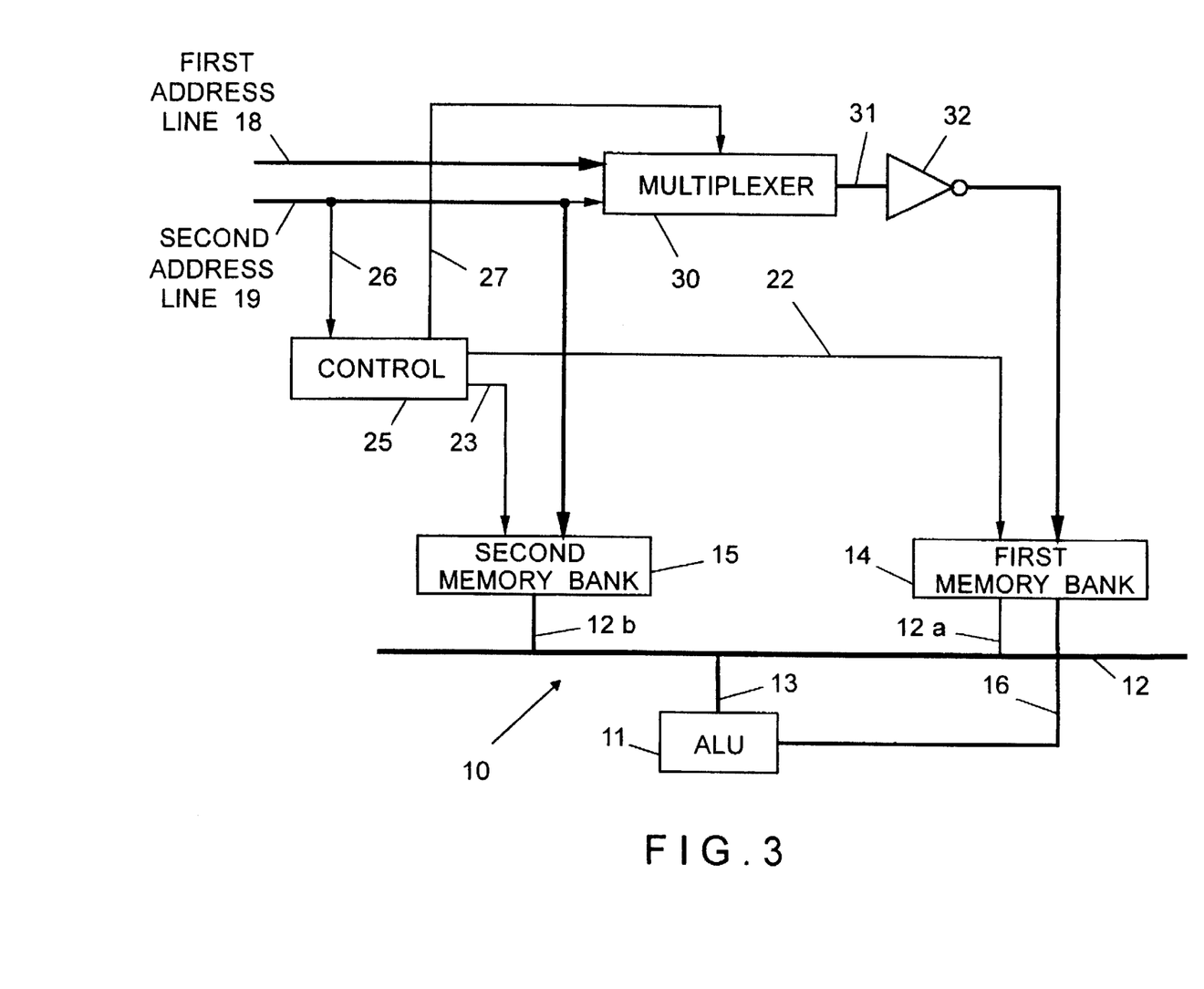
FIG. 3 relates to FIG. 1 and shows the flow of data therein in the second type instruction mode.

Referring to FIG. 3, there will now be given a detailed explanation of the operation of the data processing and addressing unit 10 shown in FIG. 1 for use with second type instructions. FIG. 3 is similar to FIG. 1 but further includes heavy lines corresponding to control signals and data flow. To the extent that the two figures are identical, the same reference numerals will be employed in the following description.

By way of example, prior to the processing of the data block, the address line 19 is set to point to address 0 in the second memory bank 15 whilst the address line 18 is set to point to address (FFFF)$_{hex}$. After the present operand is fetched and assuming each operand occupies one byte, the address loaded on the address line 19 is incremented by one from address 0 to 1, whilst the address loaded on the address line 18 is decremented by one from address (FFFF)$_{hex}$ to (FFFE)$_{hex}$. The manner in which the addresses are incremented and decremented by one or more steps is known per se in the art and there is therefore no need to describe it in further detail.

In operation, when an instruction is fetched from the program memory area, it is decoded in order to ascertain whether it belongs to the first or second type. The decoding may be achieved in various ways. Thus, for example, a specified bit can be set in the opcode to denote an instruction of the first or second type depending on its status. In the case where the fetched instruction is of the second type, the control unit 25 instructs the multiplexer 30 to connect the first address line 18 via the inverter 32 to the first memory bank 14. The control unit 25 further sends a module select signal along the select line 23 to the second memory bank 15, responsive to which the operand which is stored in address 0 thereof is fed to the data bus 12 and is thence routed to the ALU 11.

The value (FFFF)$_{hex}$ which is loaded on the first address line 18 is complemented to form the value 0 this being in turn fed from the inverter 32 to the first memory bank 14. Thus, responsive to the address (FFFF)$_{hex}$ appearing at the output 31 of the multiplexer 30, the operand is 10 fetched from address 0 (which corresponds to address (FFFF)$_{hex}$ in the address space) and transferred via the dedicated bus 16 to the ALU 11. In such manner, both operands are fed to the ALU 11 via the data buses 12 and 13 and the dedicated bus 16, respectively.

The dedicated bus 16 is so arranged that it is active in spite of the fact that the first memory bank 14 is not selected by the module select signal 22. Since in this case the data bus 12 conveys only the operand derived from the second memory bank 15 via data bus 12b, there is no risk of interference with data representing the operand derived from the first memory bank 14 via the dedicated bus 16. In order to access the next pair of operands, the address lines 18 and 19 are loaded with the values 1 and (FFFE)$_{hex}$ respectively. By following this scheme, the entire 200 memory locations in each memory bank are accessed.

Figure 4:
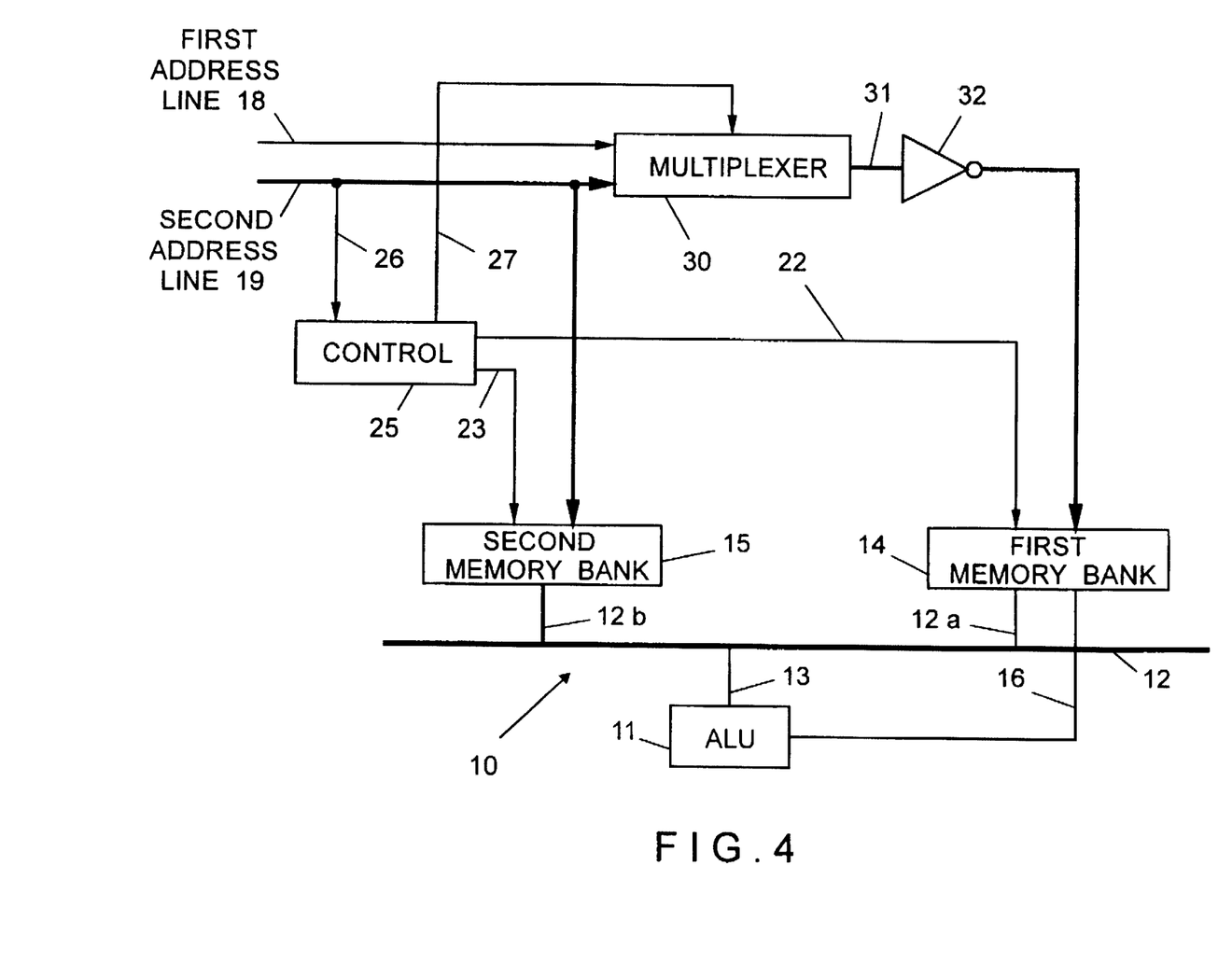
FIG. 4 relates to FIG. 1 and shows the flow of data therein in the first type instruction mode.
Figure 5:
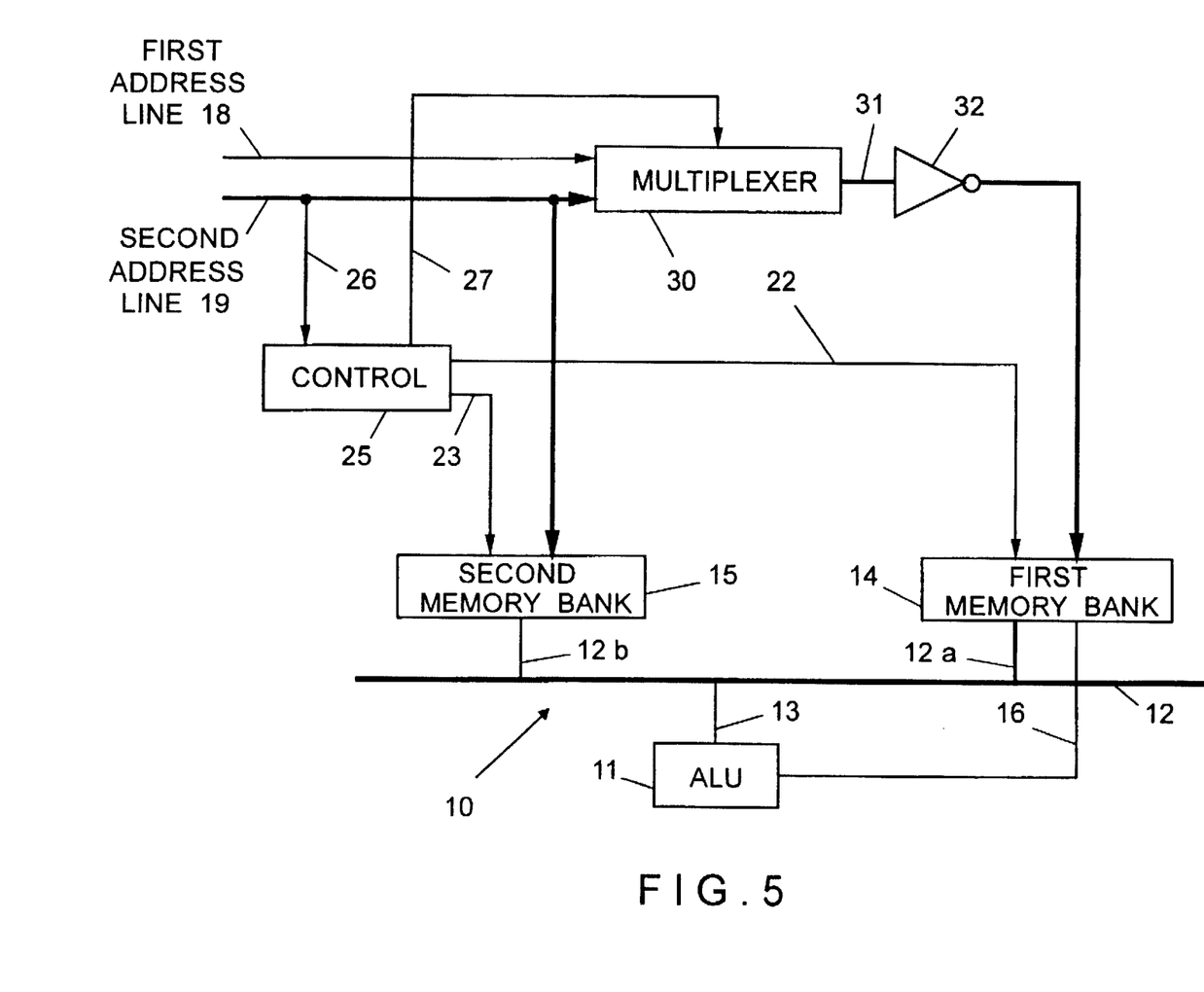
FIG. 5 relates to FIG. 1 and shows an alternative data flow in the first type instruction mode.

Referring now to FIGS. 4 and 5, there will be described an alternative mode of operation of the data processing and addressing unit 10 wherein the instructions are of the first type only, i.e. associated with a single operand access. Here also, to the extent that the data processing and addressing unit 10 shown in FIGS. 4 and 5 is identical to that described above with reference to FIGS. 1 and 3, identical reference numerals will be employed.

Consider the situation of a data buffer having 600 memory locations, e.g. for processing a table which may in turn be used for subsequent processing. Since the size of each of the first and second memory banks 14 and 15, respectively, is only 512 bytes it is impossible to store the entire data block of the 600 bytes in a single memory bank. Therefore, if the first 512 bytes are stored in the first memory bank 14, i.e. in the address range (FE00)$_{hex}$ to (FFFF)$_{hex}$ then the remaining 88 bytes of data are stored from address 0 to (58)$_{hex}$ in the second memory bank 15.

FIG. 5 shows the operation of the data processing and addressing unit 10 in this situation. The second address line 19 is loaded with the value (FE00)$_{hex}$ which is the initial address of the data block stored in the first memory bank 14. Thus, as the first instruction is fetched from the program memory area, the control unit 25 detects that it is of the first type, i.e. that only one operand access is required. In such case, the control unit 25 instructs the multiplexer 30 to route its output 31 to the address line 19 and not to the address line 18 which is not used in this mode of operation. As a result, the address line 19 is routed through the multiplexer 30 via the inverter 32 to the first memory bank 14. Simultaneously, the value loaded on the address bus 19 is directly fed to the second memory bank 15. Since only one operand is required, the control means determine which of the banks to select in accordance with a "bank select address", i.e. an address which splits the address space into two segments. The "bank select address" should preferably be so selected as to lie between the top address of the second memory bank and the bottom address of the first memory bank.

Suppose, for example, that the bank select address is selected to be (8000)$_{hex}$ whereby the address space is split into two equal sized segments. Thus, when the control unit 30 determines that the instruction is of the first type, it probes the address loaded on the address bus 19 and checks whether it is larger than the "bank select address" or equal thereto. If so, it selects the first memory bank 14 (having the high address). Otherwise, it selects the second memory bank 15.

By proper selection of the "bank select address", it is assured that the appropriate memory bank will be selected for any size of first and second memory banks used.

In the specific embodiment described above with particular reference to FIG. 5, the control unit 25 initiates the module select signal 22 to select the first memory bank, since the address (FE00)$_{hex}$ is larger than (8000)$_{hex}$. Consequently, as explained above with reference to FIG. 3, the operand retrieved from this particular address is transferred to the ALU 11 via the data bus 12. The same data is transferred through the dedicated bus 16 to the second position of the ALU 11 but it is not used since the ALU 11 is already aware that the current instruction requires only a first type.

In order to fetch the next operand, the second address line 19 is incremented to point to (FE01)$_{hex}$ and the operand corresponding thereto is accessed. This routing continues until an operand is fetched from address (FFFF)$_{hex}$. As the next operand is fetched, the address is set to (10000)$_{hex}$ and, since the most significant bit exceeds the capacity of the 64K module and is therefore redundant, the new address is in practice set to zero. Since zero is less than the bank select address the second memory bank 15 is selected by the module select signal and the operand which resides in address 0 therein is routed to the ALU 11 as shown in FIG. 4. In a similar manner the rest of the 87 operands are fetched by incrementing the value loaded on address bus 19 to 1,2, . . . (58)$_{hex}$, respectively.

Figure 6:
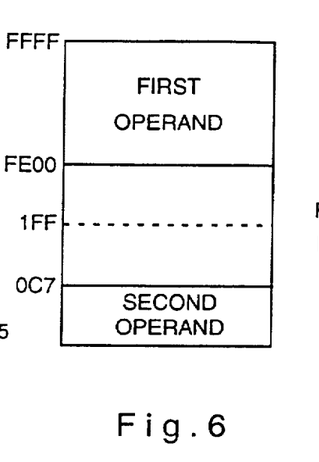
FIG. 6 shows schematically a logical arrangement of first and second memory banks constituting one continuous buffer.

FIG. 6 shows schematically that once (FFFF)$_{hex}$ is accessed the next address is automatically adjusted to zero and the next operand is extracted from the bottom address of the second memory bank 15. It is thus shown that in this mode of operation the two memory banks 14 and 15 behave as one continuous buffer.

Figure 7:
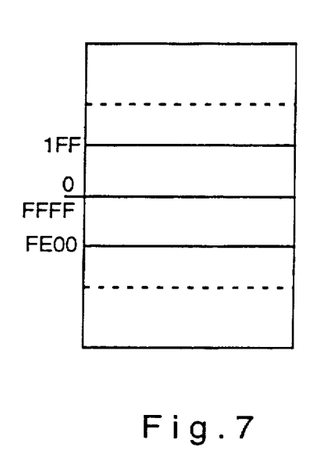
FIG. 7 shows schematically an arrangement of first and second memory banks having a combined size less than that of a total address space.

FIG. 7 shows more clearly the arrangement of the two memory banks in the above embodiment so as to provide, in effect, one continuous memory module having a central memory address of 0, whereby increasing addresses access locations in the first memory bank and decreasing addresses access locations in the second memory bank.

It has thus been shown that the data processing and addressing unit 10 may be employed for first type instructions as well as second type instructions.

Moreover, unlike hitherto proposed memory units for use with digital signal processors, the data processing and addressing unit 10 of the present invention is inherently adapted to memory expansion and contraction with no change in the logic and by retaining the continuous nature of the memory banks and further retaining the single/double operand handling flexibility.

Figure 8:
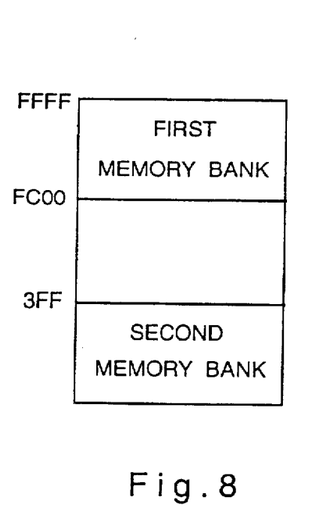
FIG. 8 relates to FIG. 3 and shows schematically a logical arrangement of the first and second memory banks in an expanded memory.
Figure 9:
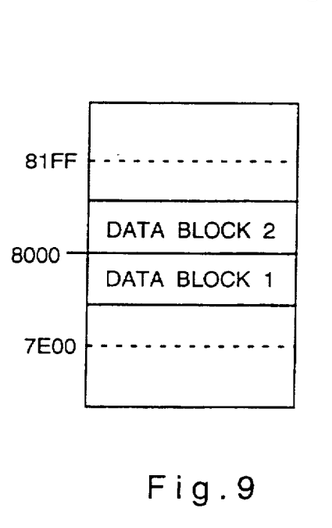
FIG. 9 shows schematically an alternative logical arrangement of first and second memory banks having a non-zero boundary address.

Thus, in practice, when it is desired by an application to utilize a 1K memory bank instead of the previous 512 bytes, the latter are simply replaced by new modules. FIG. 8 shows how the address space is mapped in such case. The first memory bank 14 extends from address (FC00)$_{hex}$ to (FFFF)$_{hex}$, whilst the second memory bank 15 extends from address 0 to (3FF)$_{hex}$. Thus the first and second memory banks 14 and 15 represent offsets of −1 up to −(400)$_{hex}$ and 0 up to (3FF)$_{hex}$ respectively. This demonstrates the straightforward expansion feature intrinsically embedded in the data processing and addressing unit 10 according to the present invention.

Various modifications may be carried out without departing from the spirit of the invention. Thus, it is not a prerequisite that the boundary address is set to 0. An alternative logical arrangement is shown in FIG. 8 in which the base address is (8000)$_{hex}$ wherein the first memory bank 14 extends from (7FFF)$_{hex}$ and below, whilst the second memory bank 15 extends from address (8000)$_{hex}$ and above. Such a modification may be implemented in a similar manner to the arrangement shown in FIGS. 3 to 5.

The bank select address need not necessarily split the entire address space into two identical segments. Thus, assuming that the first memory bank does not utilize more than 2 Kbyte then the bank select address may be set to (F800)$_{hex}$ since the largest address in the first memory bank 14 will range from (F800$_{hex}$–(FFFF)$_{hex}$.

Whilst in the preferred embodiments, an address space of 64 k was employed, it will be appreciated that the principles of the invention may equally well be applied to any required range, e.g. 4K, 256K etc. Likewise, whilst references to data has been in bytes, the data may equally well be stored in words having a specified number of bits, or in any other denomination.

It should be also noted that whilst the invention has been explained with particular regard to reading operands from a memory bank, in practice operands may be written to, as well read from, the data space. Likewise, the invention is well suited for use with different kinds of memory device such as, RAM, ROM etc. and combinations thereof.

The invention may be adapted to a general purpose processor and to digital signal processors of various architectures known per se by those skilled in the art. Thus, for example, the method described above may be adopted in a concurrent processor in which an instruction processes operands and simultaneously the operands of the next instruction are fetched, so as to increase the processing speed of the next instruction. Likewise, the present invention may be employed for digital signal processors in which the address pointer is advanced in a relative step greater than one, as may be the case if the memory bank stores bytes and each operand occupies more than one byte. It may be also adapted to a processor in which the address pointer is only incremented or decremented by one.

In the preferred embodiment an inverter is employed in order to conform the address on the address line to the address space mapped by the first memory bank. This leads to the advantage that both memory banks are of identical structure. However, it is possible to dispense with the inverter, in which case the first memory bank must be of a reverse logic type whose addresses are in the order of $(FFFF)_{hex}$, $(FFFE)_{hex}$ etc. instead of 0000, 0001, etc.

It should also be noted that according to a further embodiment of the invention, only one address line is used, e.g. first address line 18. In this case, the multiplexer unit 30 is discarded. Other implementations to carry out the invention will likewise occur to those skilled in the art.

We claim:

1. In a data addressing and processing unit comprising processing and addressing means for processing a specified set of instructions including a first and second type instruction, the first type being associated with data accessed from a single memory bank only and the second type being associated with data accessed from two memory banks simultaneously; the data addressing and processing unit further including:

first and second memory banks having respective first and second sizes which, in total, occupy no more than an entire address space allocated in the data processing and addressing unit; said first and second memory banks being mapped in continuous memory address space such that a bottom address of the second memory bank is contiguous with a top address of the first memory bank;

a method of mapping the first and second memory banks so as to permit memory expansion or contraction and so as to permit a single operand corresponding to the first type of instruction to be extracted from the first and second memory banks as if they were a single continuous memory whilst permitting a pair of operands corresponding to the second type of instruction to be extracted simultaneously each from a respective one of the first and second memory banks, the method comprising the steps of:

(i) mapping the first memory bank such that there exists a negative offset with respect to a common boundary between the first and second memory banks having an address equal to the bottom address of the second memory bank such that the top address of the first memory bank has an offset of −1 and a bottom address of the first memory bank has an offset of −(first size); and (ii) mapping the second memory bank as a positive offset with respect to the common boundary such that a top address of the second memory bank has an offset of (second size −1);

whereby expansion or contraction of the first and second memory banks may be effected relative to the common boundary between the two memory banks and independent of their respective sizes.

2. A data processing and addressing unit for processing and addressing a set of either first type instruction having associated therewith a single operand stored in a single memory bank or a second type instruction having associated therewith a pair of operands each stored in a respective one of two memory banks, said data processing and addressing unit comprising:

an address space of a predetermined size, first and second memory banks having respective first and second sizes which in total are no greater than the predetermined size of the address space and which are mapped in continuous memory address space such that a bottom address of the second memory bank is contiguous with a top address of the first memory bank, first and second address lines for respectively carrying an address of a first and second operand, control means coupled to the second address line and responsive to an instruction of said first type and to the address on the second line for generating a first switching signal as well as first and second memory bank selection signals, and being responsive to an instruction of said second type and to the address on the second address line for generating a second switching signal as well as a second memory bank selection signal, switching means coupled to the control means and responsive to the first switching signal for connecting the second address line to the first memory bank and being responsive to the second switching signal for connecting the first address line to the first memory bank, and a dedicated bus connected to the first memory bank and active even when the first memory bank is not selected by the control means for retrieving an address from the first memory bank;

whereby a single operand of a first type instruction is selected from either the first or second memory bank according to whether the address on the second address line points to an address in the first or second memory bank, respectively; and first and second operands of a second type instruction are respectively selected from the first and second memory banks.

3. The data processing and addressing unit according to claim 2, wherein the switching means includes a multiplexer having two inputs respectively connected to the first and second address lines and having an output connected to the first memory bank.

4. The data processing and addressing unit according to claim 2, wherein the first and second memory banks both have an identical bottom physical address, the address of the second address line constitutes a physical address for accessing data from the second memory bank and the switching means includes an inverter for inverting the address of the first address line prior to accessing the first memory bank so as to derive a physical address for accessing data from the first memory bank, whereby the address accessed in the first memory bank is the complement of the address on the first address line, thereby permitting the first and second memory banks to be of identical structure in the respect that an address in the first memory bank, being smaller than or equal to said top address by a given absolute offset, and an address on said second memory bank, being larger than or equal to said bottom address by said absolute offset are mapped both to identical physical addresses in the respective memory banks.

5. The data processing and addressing unit according to claim 3, wherein the first and second memory banks both have an identical bottom physical address, the address of the second address line constitutes a physical address for accessing data from the second memory bank and further including an inverter connected to an output of the multiplexer for inverting the address of the first address line prior to accessing the first memory bank so as to derive a physical address for accessing data from the first memory bank, whereby the address accessed in the first memory bank is the complement of the address on the first address line, thereby permitting the first and second memory banks to be of identical structure in the respect that an address in the first memory bank, being smaller than or equal to said top address by a given absolute offset, and an address on said second memory bank, being larger than or equal to said bottom address by said absolute offset are mapped both to identical physical addresses in the respective memory banks.

6. The data processing and addressing unit according to claim 2, for use in a general purpose processor.

7. The data processing or addressing unit according to claim 2, for use in a general purpose processor.

* * * * *